US012005022B2

(12) United States Patent
Williams

(10) Patent No.: US 12,005,022 B2
(45) Date of Patent: *Jun. 11, 2024

(54) # MASSAGE TOOL ROTATABLY ATTACHABLE TO A RECIPROCATING MOTOR

(71) Applicant: Eddy Arnold Williams, Pocatello, ID (US)

(72) Inventor: Eddy Arnold Williams, Pocatello, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,955

(22) Filed: Dec. 19, 2022

(65) Prior Publication Data

US 2023/0181417 A1 Jun. 15, 2023

Related U.S. Application Data

(63) Continuation of application No. 16/968,866, filed as application No. PCT/US2020/027432 on Apr. 8, 2020, now Pat. No. 11,529,284.

(Continued)

(51) Int. Cl.
*A61H 23/02* (2006.01)
*A61H 23/00* (2006.01)

(52) U.S. Cl.
CPC ... *A61H 23/0254* (2013.01); *A61H 2023/002* (2013.01); *A61H 2201/0153* (2013.01); *A61H 2201/149* (2013.01); *A61H 2201/1678* (2013.01)

(58) Field of Classification Search
CPC .......... A61H 23/0254; A61H 2023/002; A61H 2201/0153; A61H 2201/149;

(Continued)

(56) References Cited

U.S. PATENT DOCUMENTS 1,340,959 A 5/1920 Jones
1,796,444 A 3/1931 Dell et al.

(Continued)

FOREIGN PATENT DOCUMENTS

BE 1020090 4/2013
JP 3048379 U 5/1998

(Continued)

OTHER PUBLICATIONS

English translation of Guochin TWM281618U, http://worldwide.espacenet.com/, (2022).

(Continued)

*Primary Examiner* — Quang D Thanh
(74) *Attorney, Agent, or Firm* — Burdick Patents, P.A.; Sean D. Burdick; Colin L. Honan

(57) ABSTRACT

A massage tool includes a rod having a proximal end and a distal end, and a body follower having a proximal side and a distal side. The proximal end is configured for attachment to a reciprocating shaft of a reciprocating motor. The reciprocating shaft has a stroke axis and a stroke length, and the distal end of the rod is configured to rotatably attach to the proximal side of the body follower by means of a rotating joint defining a center of rotation. The distal side of the body follower may include a body contact area having a maximum length at least three times greater than a minimum distance from the center of rotation of the rotating joint to the body contact area.

18 Claims, 8 Drawing Sheets

Related U.S. Application Data

(60) Provisional application No. 62/950,112, filed on Dec. 19, 2019, provisional application No. 62/830,698, filed on Apr. 8, 2019.

(58) Field of Classification Search
CPC .... A61H 2201/1678; A61H 2201/0157; A61H 2201/1669; A61H 2201/1676
See application file for complete search history.

(56) References Cited

U.S. PATENT DOCUMENTS

| | | | | |
|---|---|---|---|---|
| 2,001,871 | A * | 5/1935 | Foster | A61H 7/002 601/136 |
| 2,076,410 | A | 4/1937 | Mcgerry | |
| 2,078,025 | A | 4/1937 | Samuels | |
| 2,512,536 | A | 6/1950 | Zadek | |
| 2,626,934 | A * | 1/1953 | Kesler | C09J 103/02 524/48 |
| 3,837,335 | A | 9/1974 | Teranishi | |
| 3,984,890 | A | 10/1976 | Collis | |
| 4,088,128 | A | 5/1978 | Mabuchi | |
| 4,141,375 | A | 2/1979 | Tykwinski | |
| 4,495,940 | A | 1/1985 | Takaishi | |
| 4,549,535 | A | 10/1985 | Wing | |
| 4,566,442 | A | 1/1986 | Mabuchi et al. | |
| 4,716,890 | A | 1/1988 | Bichel | |
| 4,730,605 | A | 3/1988 | Noble et al. | |
| 4,841,955 | A | 6/1989 | Evans et al. | |
| 5,140,979 | A | 8/1992 | Nakagawa | |
| 5,300,095 | A | 4/1994 | Salazar | |
| 5,618,315 | A | 4/1997 | Elliott | |
| 5,626,615 | A | 5/1997 | Keller et al. | |
| 5,632,765 | A | 5/1997 | Holder | |
| 5,923,107 | A | 7/1999 | Franck | |
| 5,951,501 | A | 9/1999 | Griner | |
| 6,228,042 | B1 | 5/2001 | Dungan | |
| 6,805,700 | B2 | 10/2004 | Miller | |
| 10,357,425 | B2 | 7/2019 | Wersland et al. | |
| 10,470,970 | B2 | 11/2019 | Nazarian et al. | |
| 10,557,490 | B2 | 2/2020 | Wersland et al. | |
| 11,529,284 | B2 * | 12/2022 | Williams | A61H 23/0254 |
| 2002/0082532 | A1 | 6/2002 | Tucek et al. | |
| 2005/0131461 | A1 * | 6/2005 | Tucek | A61H 1/008 601/108 |
| 2015/0005682 | A1 * | 1/2015 | Danby | A61H 23/0254 601/101 |
| 2016/0206502 | A1 | 7/2016 | Køltzow | |
| 2016/0213554 | A1 | 7/2016 | Possemato et al. | |
| 2016/0367425 | A1 | 12/2016 | Wersland | |
| 2017/0156974 | A1 * | 6/2017 | Griner | A61H 23/006 |
| 2017/0304145 | A1 | 10/2017 | Pepe | |
| 2019/0015294 | A1 * | 1/2019 | Nazarian | A61H 15/00 |
| 2019/0232403 | A1 | 8/2019 | Candelaria | |

FOREIGN PATENT DOCUMENTS

| | | | |
|---|---|---|---|
| TW | M281618 | U | 12/2005 |
| WO | 9702769 | A1 | 1/1997 |
| WO | 0174289 | A1 | 10/2001 |
| WO | 2016209759 | A1 | 12/2016 |
| WO | 2019014031 | A1 | 1/2019 |

OTHER PUBLICATIONS

International Preliminary Report on Patentability dated Sep. 28, 2021 for PCT/US2020/027342.

International Search Report and Written Opinion dated Jul. 16, 2020 for corresponding PCT/US20/27342 (8 pages).

Pado Inc. "PureWave" web pages, Feb. 24, 2019, avail. at https://padousa.com.

Theragun Inc. "Theragun" web pages, Mar. 8, 2019, avail. at https://theragun.com.

EP Extended Search Report dated Dec. 8, 2022, to EP Patent Application No. 20787194.8.

* cited by examiner

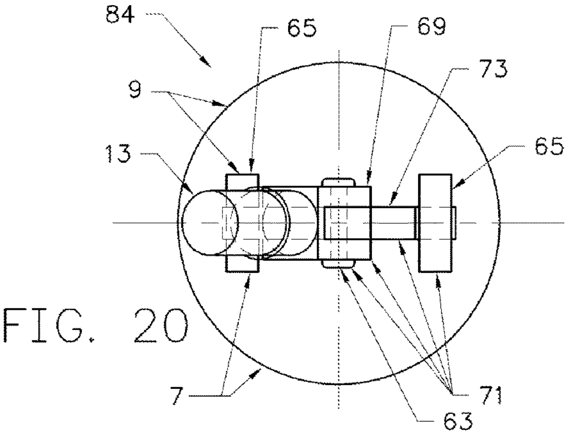
FIG. 20
FIG. 21
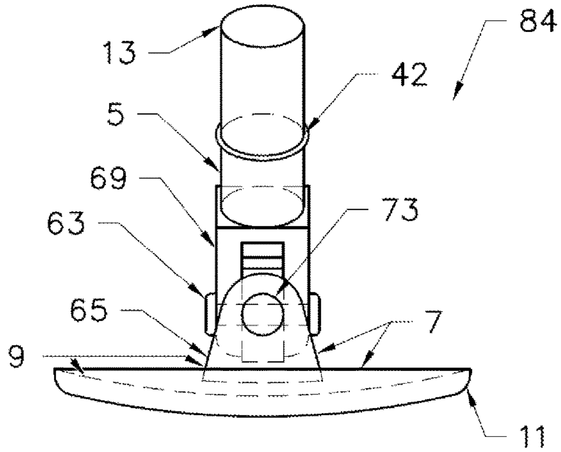
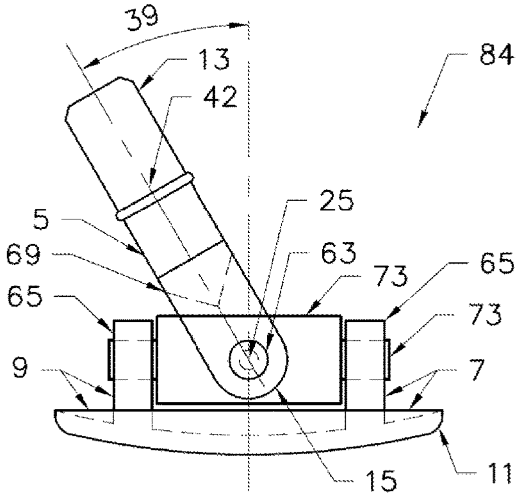
FIG. 22
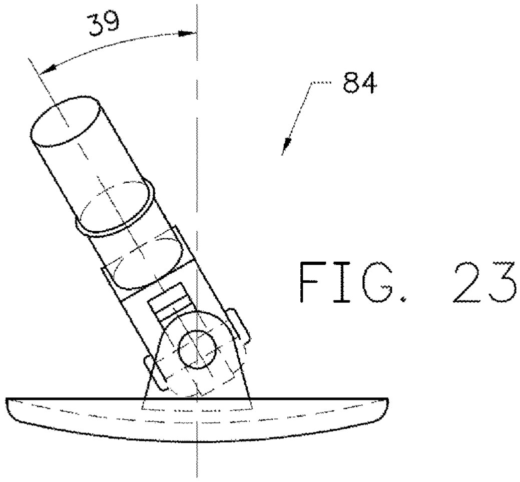
FIG. 23

MASSAGE TOOL ROTATABLY ATTACHABLE TO A RECIPROCATING MOTOR

RELATED APPLICATIONS

This application is a Continuation of and claims priority to U.S. patent application Ser. No. 16/968,866 (now U.S. Pat. No. 11,529,284) filed on Aug. 10, 2020, which is a national stage entry that claims priority to PCT/US20/27342 filed Apr. 8, 2020, which in turn claims priority to U.S. Provisional Application 62/830,698 filed on Apr. 8, 2019 and to U.S. Provisional Application 62/950,112 filed on Dec. 10, 2019, all of which are fully incorporated herein by reference.

BACKGROUND OF THE INVENTION

Field of the Invention

The present invention relates generally to powered massage tools and reciprocating massage tools, and more specifically to a massage tool rotatably attachable to a hand-held reciprocating motor.

Description of Related Art

Massage therapists, sports trainers and chiropractors are now using various types of reciprocating motors driving variously shaped tools that contact the patient's body to provide treatment, alignment adjustment, muscle relaxation, massage, pain relief and other therapies. Reciprocating motors for these devices have included using springs, electric solenoids, rotating motors with eccentric weights, rotating motors driving reciprocating rods with direct linkages such as cams and cranks, and fluid driven pistons. Since the development and mass production of electric and battery powered carpentry jigsaws, these reciprocating motors are being converted for use as therapy devices by replacing the saw blade with a body contact tool. Common with current reciprocating therapy devices is a body contact tool that is rigidly attached to a reciprocating rod driven by a reciprocating motor. Prior art has referred to body contact tools as impact heads, plungers, massage heads, massage fingers, and hitting pads. Body contact tools include differing shapes, sizes and materials of construction. To reduce impact force and pain some body contact tools are made of soft foam rubber or have spring buffers. Miller, U.S. Pat. No. 6,805,700 B2, discloses different impact heads attached to a reciprocating rod using a coupler that is pinned "so as to prevent rotation of the impact head." These types of devices with body contact tools connected at a fixed angle to the reciprocating rod are effective but have a small body surface contact area when applied at an angle or they must be applied at a specific angle to the body surface, usually perpendicular, to distribute forces applied to the body over a larger surface area. Small tool contact areas can be useful for some types of therapy but can cause pain and bruising and may not penetrate to deeper tissues and structures. Body contact tools acting perpendicular to the body surface, when used with a reciprocating motor that has a stroke exceeding ¼ inches, often provide too much motion and impact for delicate patients, sensitive joints, sore muscles and tender body tissues.

For better treatment during body massage, an improved massage tool is needed to overcome the aforesaid problems.

SUMMARY OF THE INVENTION

The present invention provides a massage tool for attachment to a reciprocating motor, such as a hand-held motor of a general size and form as those used for power jigsaws or for known hand-held reciprocating power massage tools. The invention includes a rod and a body follower having a proximal side and a distal side. The rod has a proximal end and a distal end, wherein the proximal end of the rod is configured for attachment to the reciprocating motor. The reciprocating motor has a stroke axis and a stroke length, and the distal end of the rod is configured to rotatably attach to the proximal side of the body follower by means of a rotating joint. The rotating joint defines a center of rotation for the rod as it rotates with respect to the body follower. The distal side of the body follower has a body contact area that has a maximum length at least three times greater than a minimum distance from the center of rotation of the rotating joint to the body contact area, and at least two times greater than the stroke length of the reciprocating motor. In another embodiment, the rotating joint is configured to allow the distal side of the body follower to remain parallel with the surface of the patient's body as the angle of the stroke axis with respect to the body contact area is varied by the operator from about 90 degrees to less than about 60 degrees.

Various alternative embodiments of the invention provide a swiveled coupling between the rod and the body follower, to allow an operator to translate the body follower around and against the contact area of a patient's body with six degrees of freedom. The massage tool is preferably configured for hand-held operation that allows an operator to freely position and move the body follower against the contours of a patient's body, apply and adjust force applied through the body contact area to the surface of the patient's body, and vary an angle of the stroke axis with respect to the body contact area. Preferably, the body contact area comprises a surface that curves in the proximal direction, allowing the body follower to slide along the surface of the patient's body while reciprocating against the surface of the patient's body without binding or gouging.

Various alternative embodiments of structure for coupling the rod to the reciprocating shaft are also disclosed. The rod may be removably couplable to the reciprocating shaft by keyless friction-fit, or by threaded engagement. Various alternative embodiments of swivel structures are also disclosed that permit the body follower to rotate in either of two orthogonal axes about the distal end of the rod. These structures include rotating joints formed as specialized ball and socket joints, hinges, gimbals, universal joints, flexures, and combinations of the foregoing. In one embodiment, the rotating joint includes a flexure that allows the angle of the stroke axis with respect to the body contact area to be varied by the operator from about 90 degrees to less than about 60 degrees. In another embodiment, flexure comprises a flexible portion and an inflexible portion. In more elaborate embodiments, a massage tool according to the invention includes a body follower having a distal side configured with a plurality of body contacting nubbins or flexible bristles.

In another embodiment, a massage tool according to the invention includes a rod having a plurality of distal ends, wherein each distal end is attached to a respective one of a plurality of body followers. The plurality of body followers may be symmetrically disposed about a plane passing through the stroke axis, and the rod may include a swiveling joint that allows the plurality of distal ends to rotate about the stroke axis.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions disclosed or shown are exemplary only. In the drawings, like reference numerals may designate like parts throughout the different views, wherein:

FIG. 20 is a top view of another embodiment of a massage tool according to the invention having a rotating joint formed as a universal joint on the proximal side of a body follower that is formed as a circular section of a sphere having rounded edges on its distal side.

FIG. 21 is a side view of the massage tool of FIG. 20.

FIG. 22 is another side view of the massage tool of FIG. 20, displaced by 90 degrees from the side view of FIG. 21.

FIG. 23 is an alternate side view of the massage tool of FIG. 20, wherein the rod is rotated with the cross axle showing the rod partially rotated on both axes.

DETAILED DESCRIPTION OF THE INVENTION

The following disclosure presents an engineered design for a massage tool for attachment to a reciprocating motor. The reciprocating motor is preferably encased in a chassis, similar to that of a hand-held power jigsaw or hand-held reciprocating power massagers. The massage tool of the present invention is designed to be lightweight and easily removably coupled to a reciprocating shaft of the reciprocating motor, to facilitate manual operation. Preferably, the distal end of the massage tool forms a body follower that may be contoured and/or constructed from a firm but resilient material for comfortable engagement against various surfaces of a human body. A massage tool according to the present invention also preferably features one or more body followers that are coupled to one of various different types a rotatable rods, to enable a user to urge the body follower against and around the contours of the human body with six degrees of freedom.

Several illustrative embodiments of the invention are now disclosed with reference to the accompanying figures. To facilitate understanding, reference is made herein throughout to an operator and a patient; however these terms are not to be interpreted in a limiting sense. The operator is a person handling the massage tool, and may be a professional health care provider such as a chiropractor or massage therapist, or anyone else. The patient is the person whose body is engaged by the body follower of the massage tool when in use by an operator. The patient need not be someone in need of health care, as the invention may have non-medical uses that are purely recreational or relaxational. The operator and the patient may be one and the same; for example, the invention may be designed such that an operator of the massage tool may use it to massage his or her own neck, legs, or lower back.

Figures 1, 2:
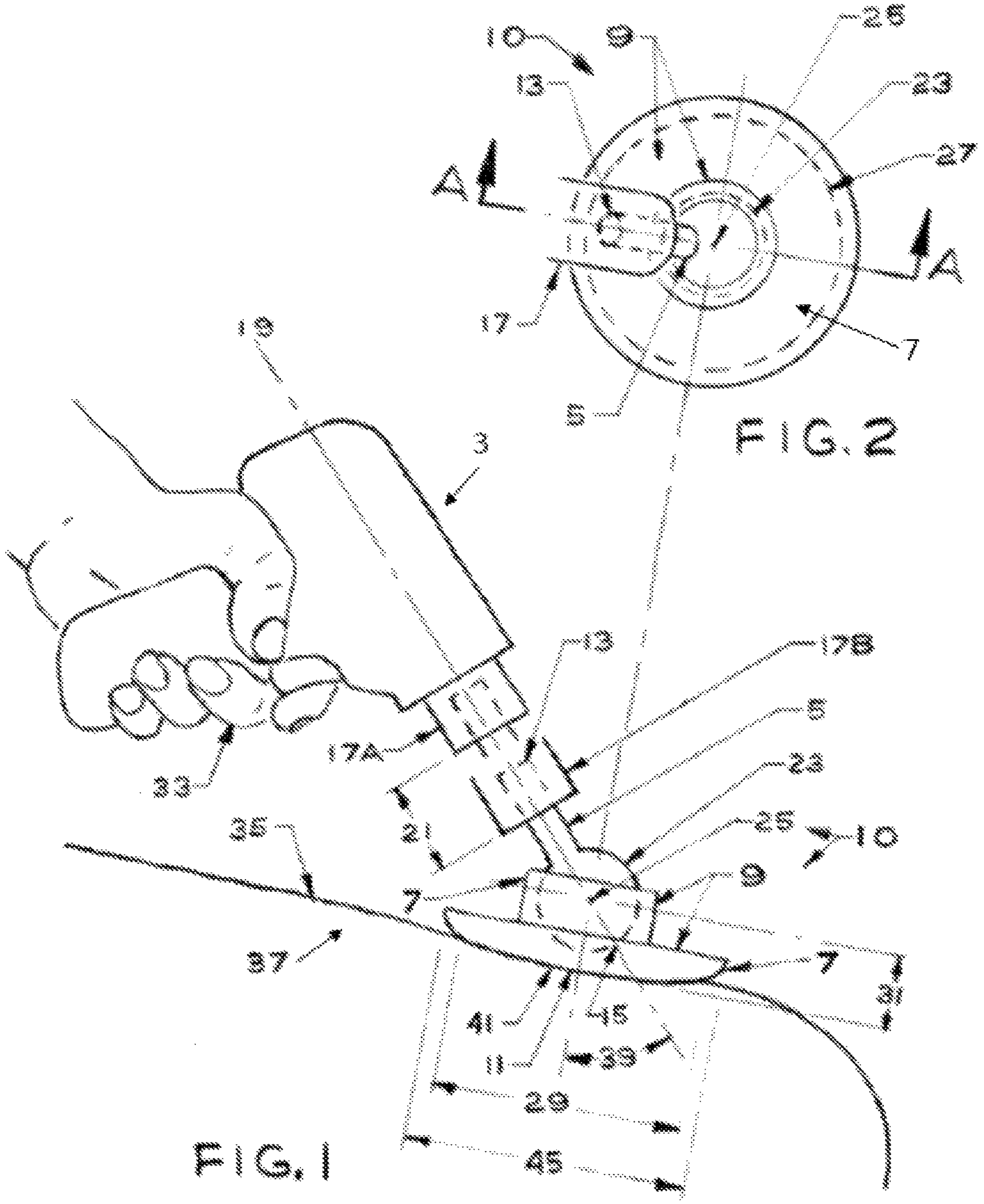
FIG. 1 is a side view of a massage tool according to one embodiment of the invention, shown in a state of use coupled to a hand-held reciprocating motor.
FIG. 2 is a top view of the massage tool of FIG. 1 seen from the proximal end looking toward the distal end.

FIG. 1 shows a side view of a massage tool 10 according to one embodiment of the invention. The illustration shows massage tool 10 coupled to a hand-held reciprocating motor 3 in a state of use, being manipulated by the left hand of an operator 33 grasping the tool at its proximal end. The reciprocating motor 3 has a reciprocating shaft 17 which is shown in two positions 17A and 17B. The massage tool 10 also includes a rod 5 having a proximal end 13 and a distal end 15, and a body follower 7 having a proximal side 9 and a distal side 11. The reciprocating shaft 17 moves along a stroke axis 19 and has a stroke length 21. The stroke length 21 of the reciprocating shaft 17 is the distance between a fully retracted position 17A and a fully extended position 17B. The massage tool 10 is shown connected to the reciprocating shaft 17 at the extended position 17B. The proximal end 13 of rod 5 is removably coupled to the reciprocating shaft 17 allowing the massage tool 10 to be removed and replaced, preferably by hand without the use of a tool. The distal end 15 of rod 5 connects to the proximal side 9 the body follower 7 through a rotating joint 23 that has a center of rotation 25. The rotating joint 23 may take on many different forms, as will be disclosed further on herein. The distal side 11 of body follower 7 presses on a contact area on a surface 35 of a patient's body 37. During operation, the contact area on the patient's body may vary in both location and size as the body follower 10 is moved against and around the patient's body while maintaining contact therewith. For example, the contact area on the patient's body 37 may be a mere point where a portion of the distal side 11 of the body follower 7 barely touches the patient, or it may be a much larger area in a case where substantially all of the distal side 11 makes contact with the patient. The portion of the surface of the distal side 11 of the body follower 7 that is designed to press onto the contact area of the patient's body 37 is referred to herein as the body contact area 27 (FIG. 2). The body contact area 27 may also be defined in the absence of patient contact, as that portion of the distal surface of the body follower 7 that is substantially planar. When the center point of the distal side 11 of the body follower 7 rests on a horizontal plane, the substantially planar area on the distal surface of the body follower 7 is the area that includes all points on the distal surface through which a tangent line forms an angle with respect to the horizontal plane of about 9 degrees or less. When sufficient force is applied to the body follower 7 against a relatively large area of a patient's body (e.g. an upper thigh as shown in FIG. 1) to press substantially all of the distal side 11 of the body follower against the patient's body, the contact area on the surface of the patient's body 37 and the body contact area 27 of body follower 7 are substantially the same area. When less force is applied, the body contact area 27 will diminish to cover a lesser area of the patient's body that corresponds to length 29.

The configuration of the massage tool 10 by which it couples to the reciprocating shaft 17 and to the rotating joint 23, which is in turn rotatably coupled to the body follower 7, allows the operator 33 to manipulate the position of the body follower 7 with six degrees of freedom. For example, the operator 33 may adjust the force applied to the body follower 7 against the patient's body and the angle 39 of the stroke axis 19 with respect to the body contact area 27. The rotating joint 23 allows the distal side 11 of the body follower 7 to remain aligned with the surface of the patient's body when the complementary angle of the stroke axis 19 is reduced from 90 degrees to less than 60 degrees, which causes the body follower 7 to slide along the surface of the patient's body. As depicted in FIG. 1, the angle 39 is about 30 degrees, and its complementary angle, that is, the angle of the stroke axis 19 with respect to the surface of the patient's body, is about 60 degrees.

To allow the body follower 7 to be more easily translated along the surface of the patient's body, its distal side 11 may have a curved or contoured shape 41 so that it will tend to slide on, as it reciprocates against, the surface of the patient's body. Preferably, the contoured shape 41 is concave, when viewed from the perspective of FIG. 2; that is, the curvature of the body follower from its center toward its perimeter turns only toward the proximal direction. According to one embodiment of the invention, for the body follower 7 to slide freely along the surface of the patient's body without tipping or gouging an edge, the distal side of the body follower 7 may have a maximum length 45 at least three times greater than a minimum distance 31 from the center of rotation 25 of the rotating joint 23 to the distal side of the body follower 7. In addition, the length 45 of the distal side 11 of body follower 7 may be at least two times greater than the stroke length 21 of the reciprocating shaft 17.

FIG. 2 is a top view of massage tool 10, as seen from the proximal end of the tool looking toward the distal end of the tool. This figure defines a section A-A that provides a reference for several alternative embodiments 30, 40, 50 and 60 of a massage tool according to the invention, each varying somewhat in the design of a means for removably coupling the massage tool to the shaft 17 of a reciprocating motor 3.

Figure 3:
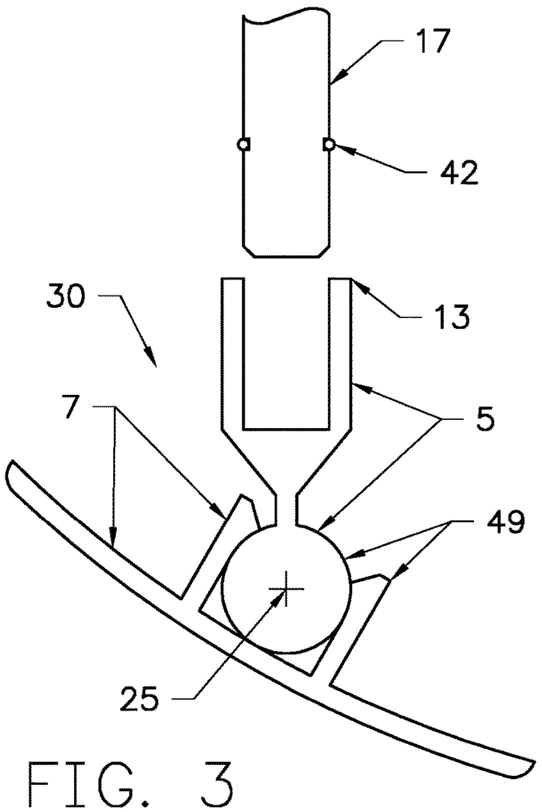
FIG. 3 is a cross-sectional view, taken along section A-A of FIG. 2, showing one embodiment of a means for removably coupling the massage tool to a reciprocating shaft.

FIG. 3 shows a cross-sectional view of a massage tool 30, taken along section A-A of FIG. 2. Massage tool 30 provides a means for removably coupling the rod 5 to the reciprocating shaft 17. In this embodiment, rod 5 includes a hollow channel sized to accommodate shaft 17. The shaft 17 has an o-ring 42 installed in a groove cut circumferentially into the shaft. When coupling the rod 5 to the shaft 17, and operator forces the rod 5 by hand onto the shaft 17, and the o-ring 42 provides friction sufficient to maintain engagement of the shaft within the rod during operation of the massage tool.

Figure 4:
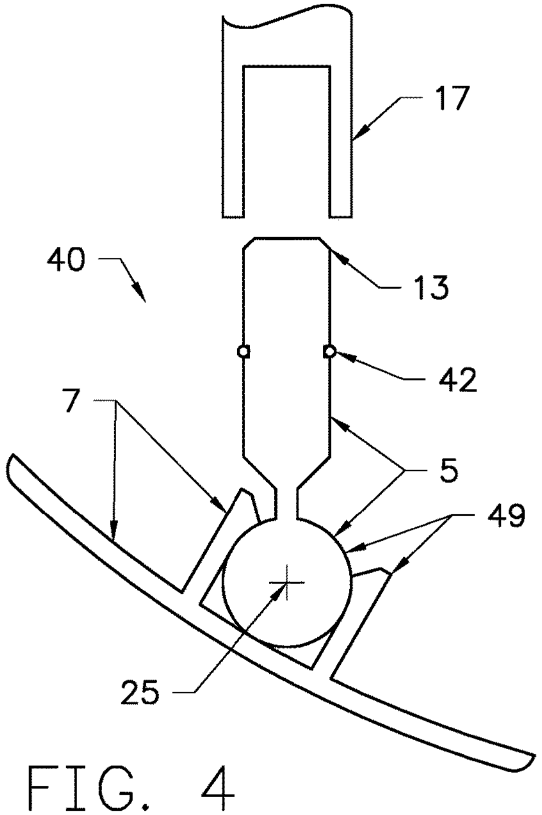
FIG. 4 is a cross-sectional view, taken along section A-A of FIG. 2, showing a second embodiment of a means for removably coupling the massage tool to a reciprocating shaft.

FIG. 4 shows a cross-sectional view of a massage tool 40, taken along section A-A of FIG. 2. Massage tool 40 provides an alternative means for removably coupling the rod 5 to the reciprocating shaft 17. In this embodiment, shaft 17 includes a hollow channel sized to accommodate the rod 5. O-ring 42 is installed in a circumferential groove that is formed on the rod 5. When coupling the rod 5 to the shaft 17, and operator forces the rod by hand into the shaft 17, and the o-ring 42 provides friction sufficient to maintain engagement of the rod within the shaft during operation of the massage tool.

Figure 5:
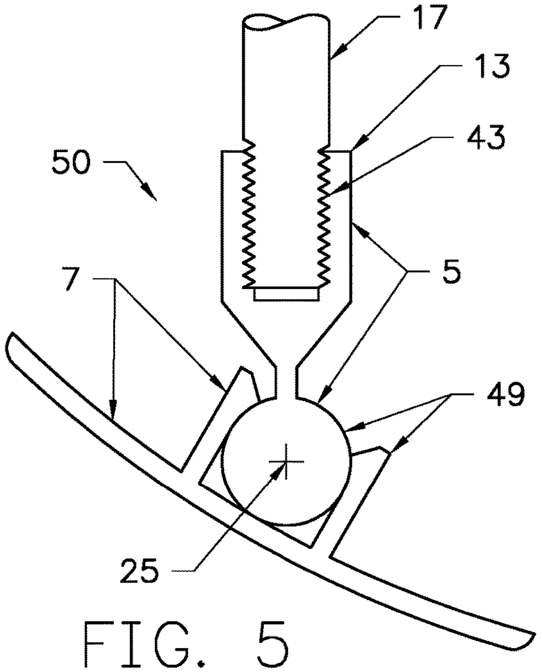
FIG. 5 is a cross-sectional view, taken along section A-A of FIG. 2, showing a third embodiment of a means for removably coupling the massage tool to a reciprocating shaft.

FIG. 5 is a cross-sectional view of a massage tool 50, taken nominally along section A-A of FIG. 2 for ease of illustration. Massage tool 50 represents a third embodiment of a means for removably coupling the rod 5 to a reciprocating shaft 17. Here, the rod 5 and shaft 17 are manually threadably engageable and disengageable by a set of mating threads 43. In this embodiment, the threads on rod 5 are formed as a female complement to male threads formed on shaft 17.

Figure 6:
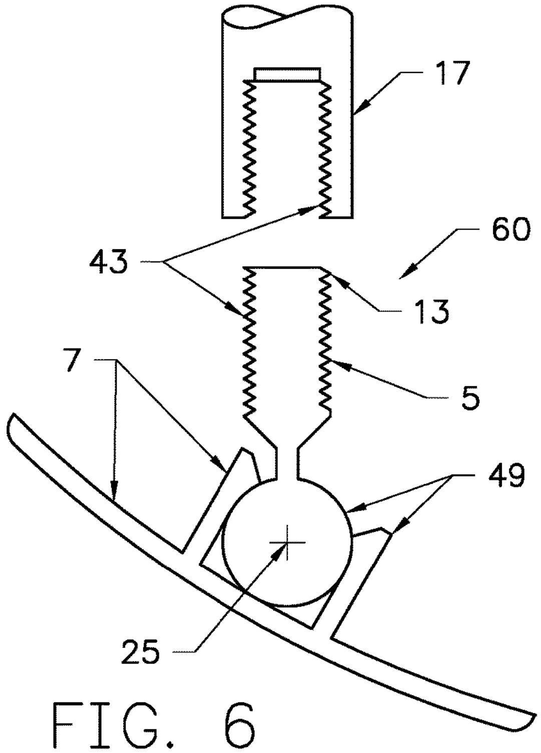
FIG. 6 is a cross-sectional view, taken along section A-A of FIG. 2, showing a fourth embodiment of a means for removably coupling the massage tool to a reciprocating shaft.

FIG. 6 is a cross-sectional view of a massage tool 60, taken nominally along section A-A of FIG. 2 for ease of illustration. Massage tool 60 is a fourth embodiment of a means for removably coupling the rod 5 to a reciprocating shaft 17, which is also effected by threaded engagement. The threaded engagement is similar to that of massage tool 50, except that the threads on rod 5 are formed as a male complement to female threads formed on shaft 17.

Figure 7:
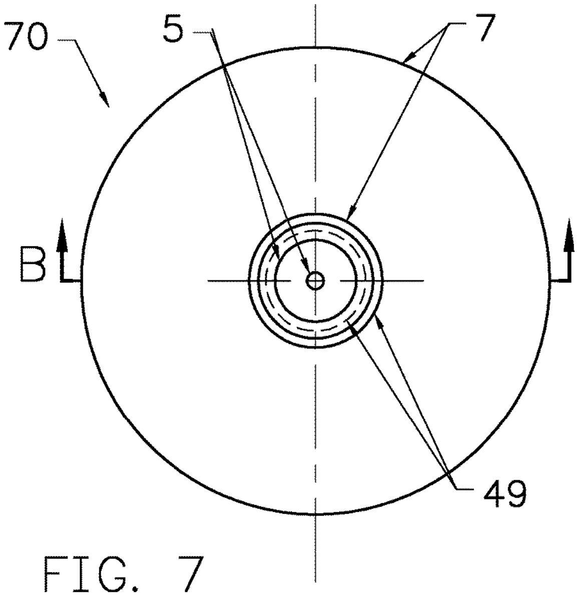
FIG. 7 is a top view of the proximal side another embodiment of a massage tool according to the invention having a rotating joint formed as a ball and socket joint on the proximal side of a circular body follower.

FIG. 7 is a top view of the proximal side of another embodiment according to the invention of a massage tool 70. Massage tool 70 has a rotating joint formed as a ball and socket joint 49 on the proximal side of a circular body follower 7. This figure defines a section B-B that provides a reference for several alternative embodiments 70, 72, 74, and 76 of a massage tool according to the invention, each varying somewhat in the design of the rotating joint 23.

Figure 8:
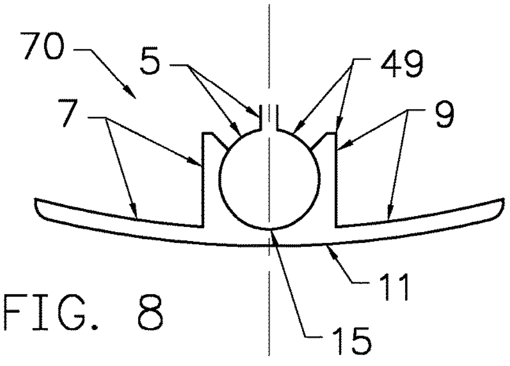
FIG. 8 is a cross-sectional view of the massage tool, taken along section B-B of FIG. 7.

FIG. 8 is a cross-sectional view of massage tool 70, taken along section B-B. The socket portion of the joint 49 is formed on the proximal side 9 of the body follower 7, and is preferably centrally placed thereon, as shown. Other embodiments of a massage tool are possible within the scope of the invention wherein the socket portion is formed on body follower 7 off-center. The ball portion of the joint 49 is formed on the distal end 15 of the rod 5. In this view, the rod 5 is shown aligned with the centerline of the figure and substantially perpendicular to the body contact area on the distal side 11 of the body follower 7. In operation, the rod 5 may be rotated with respect to the body contact area 27 about any axis passing through the center of rotation by an angle in the range of about 0 to 30 degrees from the vertical centerline. In another embodiment, the range of that angle may be about 0 to 45 degrees.

Figure 9:
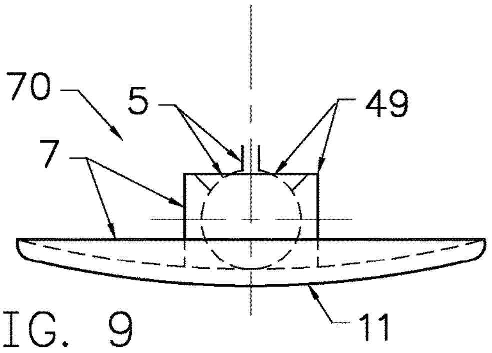
FIG. 9 is an elevation view of the massage tool of FIG. 7.

FIG. 9 is an elevation view of the massage tool 70, showing the center of rotation of the rotating joint 49 at the intersection of the centerlines. In this embodiment, the body contact area 27 on the distal side 11 of the body follower may be formed as a spherical section.

Figure 10:
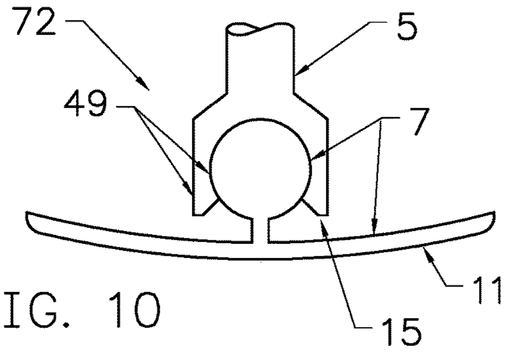
FIG. 10 is a cross-sectional view of another embodiment of a massage tool of the present invention having a rotating joint formed as a ball and socket joint on the proximal side of a body follower, taken nominally across section B-B of FIG. 7.

FIG. 10 is a cross-sectional view of another embodiment of a massage tool 72 of the present invention. The cross-sectional view is taken nominally along section B-B of FIG. 7 for ease of illustration. Massage tool 72 has a rotating joint formed as a ball and socket joint 49 on the proximal side of a circular or oblong body follower 7. In this embodiment, the ball and socket joint 49 is reversed from that of FIG. 8, with the ball portion being a part of and extending proximally from the body follower, and with the socket portion being formed on the distal end of the rod 5. This arrangement provides a range of angular rotation of the rod 5 with respect to the body contact area 27 of the body follower about any axis passing through the center of rotation, similar to the mechanics of massage tool 70.

Figure 11:
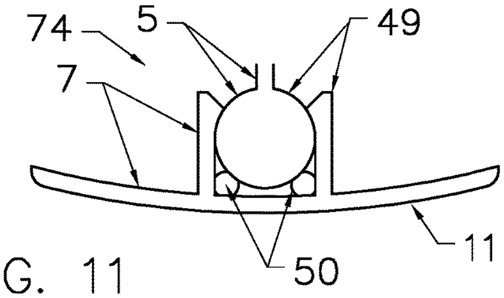
FIG. 11 is a cross-sectional view of another embodiment of a massage tool of the present invention having a rotating joint formed as a ball and socket joint on the proximal side of a body follower, taken nominally across section B-B of FIG. 7.

FIG. 11 is a cross-sectional view of another embodiment of a massage tool 74 of the present invention. The cross-sectional view is taken nominally across section B-B of FIG. 7 for ease of illustration. Massage tool 74 features a rotating joint formed as a ball and socket joint 49 on the proximal side of a circular or oblong body follower 7. A flexible cushion or rubber o-ring 50 is positioned between the body follower 7 and the ball portion of joint 49. Depending on the materials used to form massage tool 74, it may be desirable to include item 50 within the joint assembly to provide sufficient friction during rotation of the ball to enable the rod 5 to maintain a desired angular position with respect to the body follower when the rod is under force of gravity alone, or in combination with the force of the reciprocating shaft 17. At the same time, item 50 should be selected to limit the rotational friction of the ball within the socket to enable the operator to rotate the body follower without undue difficulty.

Figure 12:
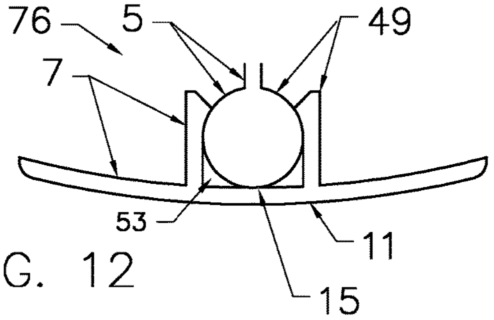
FIG. 12 is a cross-sectional view of another embodiment of a massage tool of the present invention having a rotating joint formed as a ball and socket joint on the proximal side of a body follower, taken nominally across section B-B of FIG. 7.

FIG. 12 is a cross-sectional view of another embodiment of a massage tool 76 of the present invention. The cross section is taken nominally across section B-B of FIG. 7 for ease of illustration. Massage tool 76 also has a rotating joint formed as a ball and socket joint 49 on the proximal side of a circular or oblong body follower 7. Massage tool 76 is simplified by providing a hollow void 53 in the socket portion of joint 49, without including a cushion or o-ring. This embodiment is suitable where certain plastic or elastomeric materials are used to form the joint 49.

Figure 13:
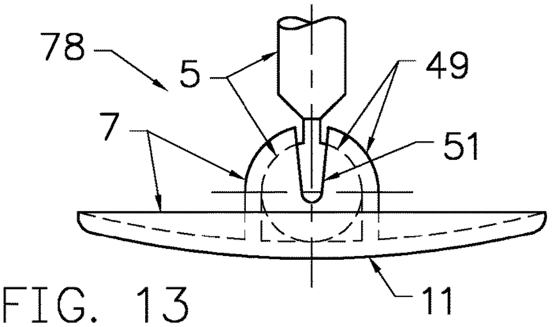
FIG. 13 is an elevation view of another embodiment of a massage tool according to the invention, having a socket formed as a spherical enclosure, with a rod slot formed in the socket.

FIG. 13 is an elevation view of another embodiment of a massage tool 78 according to the invention. Massage tool 78 features a ball and socket joint 49, wherein the socket portion is formed as a spherical enclosure having a rod slot 51 cut circumferentially along its centerline, as shown. The rod slot 51 allows the rod 5 to rotate further than the range of rotation provided by massage tools 10 or 70, as depicted in FIG. 1 and FIG. 9. With this alternate configuration, an operator using massage tool 78 can reduce the angle of the stroke axis with respect to the body contact area to about 10 degrees to provide a more gentle massage.

Figure 14:
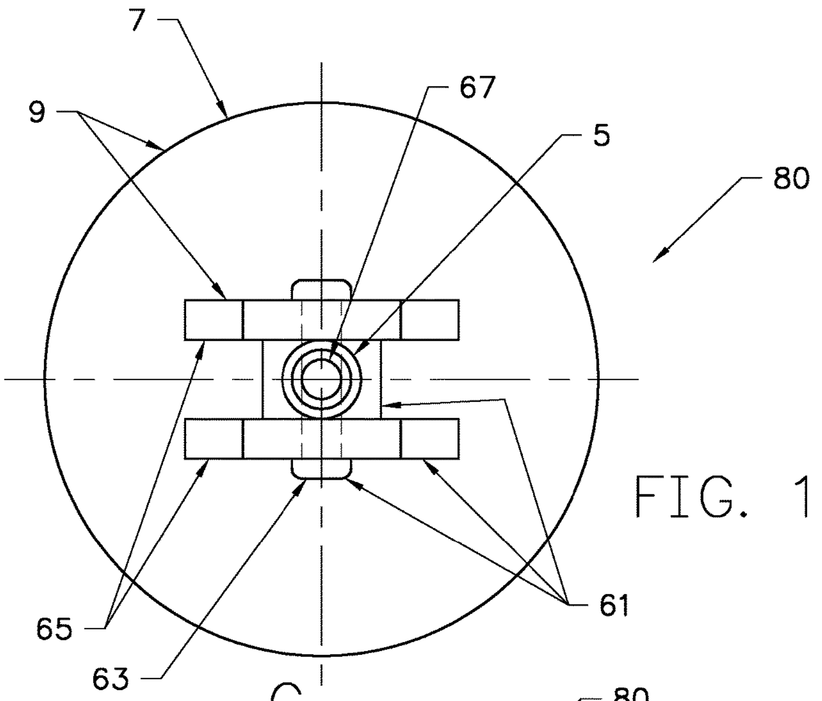
FIG. 14 is a top view of another embodiment of a massage tool according to the invention having a rotating joint formed as a hinge on the proximal side of a circular body follower.
Figure 15:
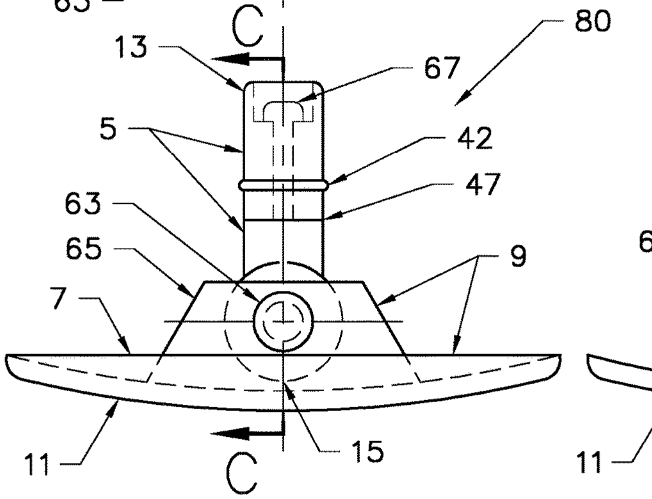
FIG. 15 is a side view of the massage tool of FIG. 14.
Figure 16:
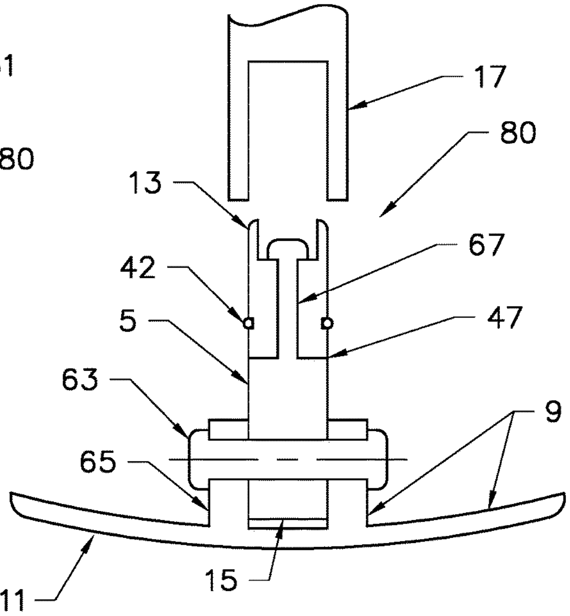
FIG. 16 is a cross-sectional view of the massage tool taken along section C-C of FIG. 15.

FIGS. 14-16 show an embodiment of a massage tool 80 according to the invention that is characterized by a rotating joint having a swivel and hinge. FIG. 14 is a top view of massage tool 80, FIG. 15 is a side view thereof, and FIG. 16 is a cross-sectional view thereof taken along section C-C of FIG. 15. The rotating joint of massage tool 80 has a hinge 61 formed on the proximal side 9 of a circular body follower 7. The body follower 7 has a dish-like shape, as the round section of a sphere, with rounded edges 44 formed on the distal side 11 and two hinge brackets 65 mounted on the proximal side 9. The distal end 15 of the rod 5 is cylindrical in form, with ends that fit between the hinge brackets 65 and that define a hole to accept a hinge pin 63. The proximal end 13 of the rod 5 has an o-ring 42 set into a groove similar to the arrangement shown in FIG. 4. The rod 5 is bifurcated and configured as a swivel 47 with a swivel retaining shaft 67. Action of the swivel 47 allows the body follower 7 to rotate around the axis of the rod 5, as the rod rotates about the hinge pin, so that an operator can translate the body follower against and along a contact area of a patient with six degrees of freedom.

Figure 17:
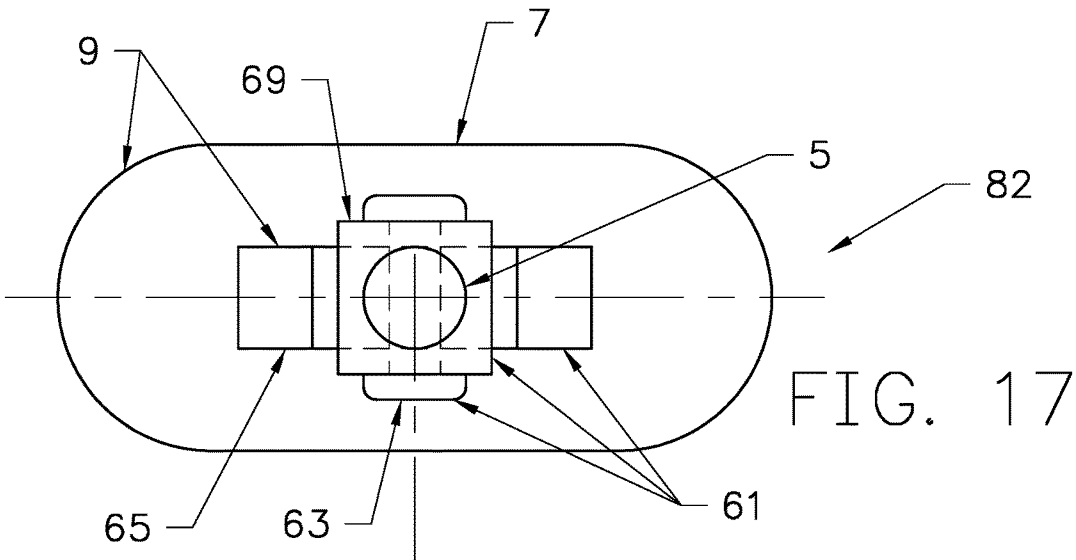
FIG. 17 is a top view of another embodiment of a massage tool according to the invention having a rotating joint formed as a hinge on the proximal side of an oblong body follower.
Figure 18:
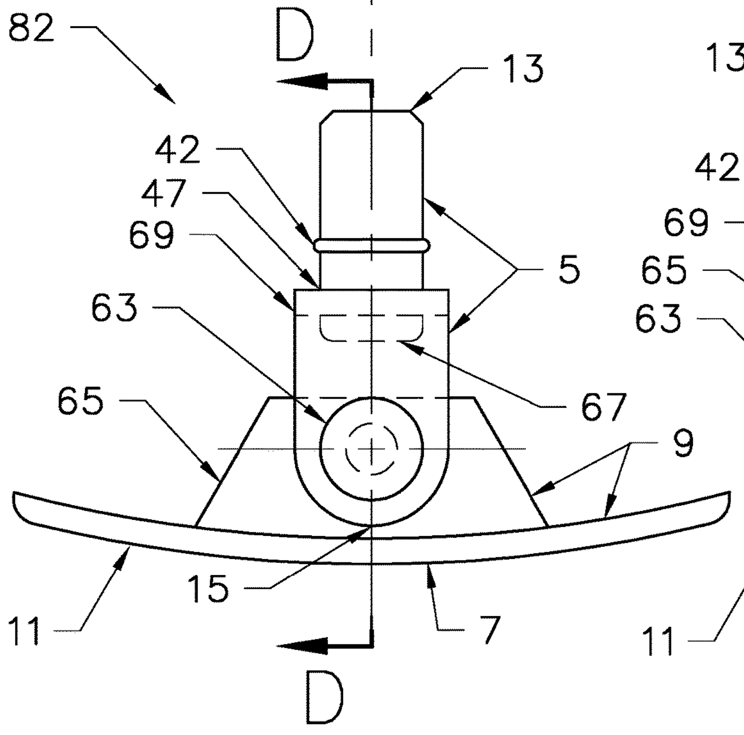
FIG. 18 is a side view of the massage tool of FIG. 17.
Figure 19:
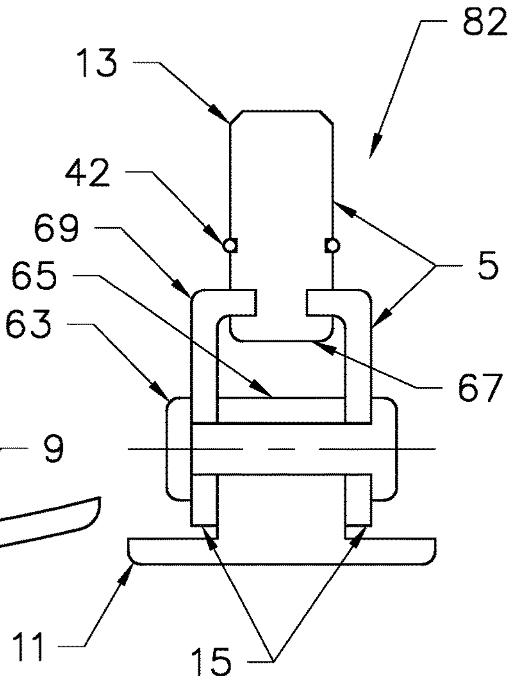
FIG. 19 is a cross-sectional view of the massage tool taken along section D-D of FIG. 18.

FIGS. 17-19 show an embodiment of a massage tool 82 according to the invention that is characterized as having a rotating joint in the form of a swivel and a hinge on the proximal side of an oblong body follower. FIG. 17 is a top view of massage tool 82, FIG. 18 is a side view thereof, and FIG. 19 is a cross-sectional view thereof taken along section D-D of FIG. 18. The proximal side of massage tool 82 includes a hinge 61 with a hinge pin 63 to form part of the rotating joint. The body follower 7 has the shape of an oblong section of a cylinder having rounded edges on the distal side 11 and a hinge bracket 65 formed on the proximal side 9. The distal end 15 of the rod 5 forms a yoke 69 having two ends fitting against each side of the hinge bracket 65 and a hole defined through all to accept the hinge pin 63. The proximal end 13 of the rod 5 has an o-ring 42 installed within a groove for connection in the manner previously shown in FIG. 4. The yoke 69 forms a distal portion of rod 5 and is connected to the proximal portion of rod 5 by a retaining swivel shaft 67. This arrangement allows the body follower to swivel by rotating about the axis of the rod while also rotating about hinge pin 63, to maintain the body contact area 27 of the body follower engaged with the contact area of the patient's body. In this embodiment, as best shown in FIG. 18, body follower 7 on its distal side 11 has a maximum length at least three times greater than a minimum distance from the center of rotation of the rotating joint to the distal side of the body follower 7. As shown in FIG. 19, the width of the distal side 11 may be less than three times the minimum distance from the center of rotation of the rotating joint to the distal side of the body follower, because the hinge 61 does not allow the body follower to rotate in the plain of rotation that is parallel to the width of distal side 11.

FIGS. 20-23 show an embodiment of a massage tool 84 according to the invention that is characterized by having a rotating joint formed as a universal joint on the proximal side of a body follower, and by having a body follower that is formed as an circular section of a sphere having rounded edges on its distal side. FIG. 20 is a top view of the proximal side of massage tool 84, FIG. 21 is a side view thereof, FIG. 22 is another side view thereof displaced by 90 degrees from the side view of FIG. 21, and FIG. 23 is an alternate side view thereof wherein the rod is rotated with the cross axle showing the rod partially rotated on both axes. On massage tool 84, the rotating joint is formed as a universal joint 71 having a hinge pin 63 and a cross axle 73. The body follower 7 has a dish-like shape, as a round or circular section of a sphere, with rounded edges on the distal side 11 and two hinge brackets 65 formed on the proximal side 9. The distal end 15 of the rod 5 includes a yoke 69 having two ends fitting against each side of the cross axle 73 and a hole defined through all to accept the hinge pin 63. The proximal end 13 of the rod 5 has an o-ring 42 installed within a groove cut into the rod 5 for connection as previously shown and described in FIG. 4. The universal joint of massage tool 84 allows an operator to move the body follower with six degrees of freedom, and in particular, to rotate the body follower about two orthogonal axes so that the body contact area 27 can remain aligned with the contact area of the patient's body as the body follower glides across varying contours of the patient's body. In one embodiment, beginning at the center of the distal side of the body follower and moving outward toward the perimeter, the contour of the body follower including the rounded edges curve in the proximal direction to provide easy translation across the patient's body and to avoid catching an edge or gouging the patient.

Figure 24:
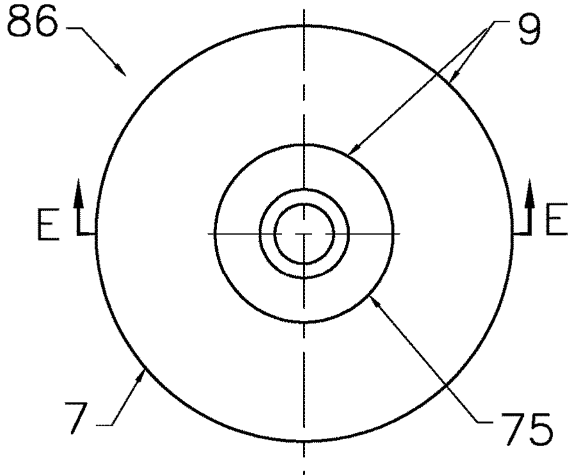
FIG. 24 is a top view of another embodiment of a massage tool according to the invention having a rotating joint formed as a flexure joint on the proximal side of a body follower that is formed as a round section of a sphere having rounded edges on its distal side.

FIG. 24 shows a top view of another embodiment according to the invention of a massage tool 86 having a rotating joint formed as a flexure joint 75 on the proximal side 9 of a body follower 7. The body follower 7 has a dish-like shape, formed as a round section of a sphere, having rounded edges on its distal side 11. Flexure joint 75 may comprise a flexure, or a flexible rod having a similar cross-sectional area as rod 5, and may be bonded, as shown, or fastened to the distal end 15 of the rod 5 and to the proximal side 9 of the body follower 7. The flexure joint allows the body follower 7 to rotate with respect to rod 5 and be translated along contours of the patient's body while the body contact area 27 remains engaged to the contact area of the patient's body.

Figure 25:
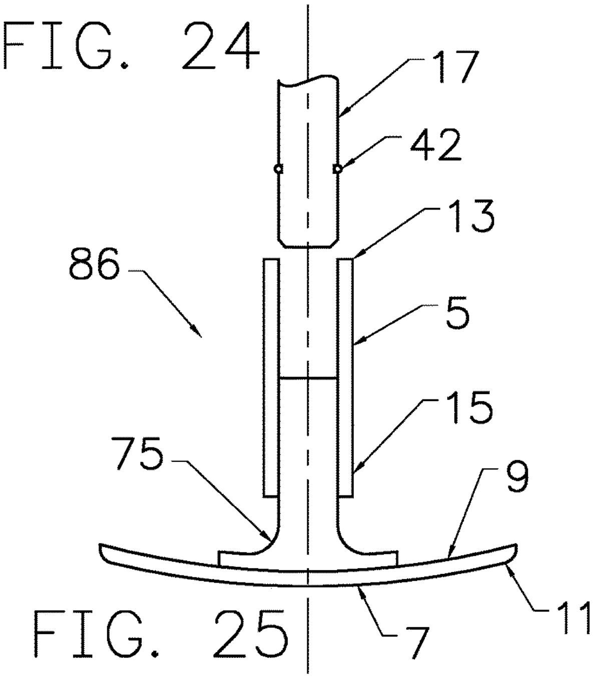
FIG. 25 is a cross-sectional view of the massage tool taken along section E-E of FIG. 24 and showing one implementation of the flexure joint.

FIG. 25 shows a cross-sectional view of massage tool 86 taken along section E-E of FIG. 24. This view shows the proximal end 13 of the rod 5 aligned for coupling to the male end of the reciprocating shaft 17. An o-ring 42 may be installed as described in previous embodiments to provide a friction fit between rod and shaft.

Figure 26:
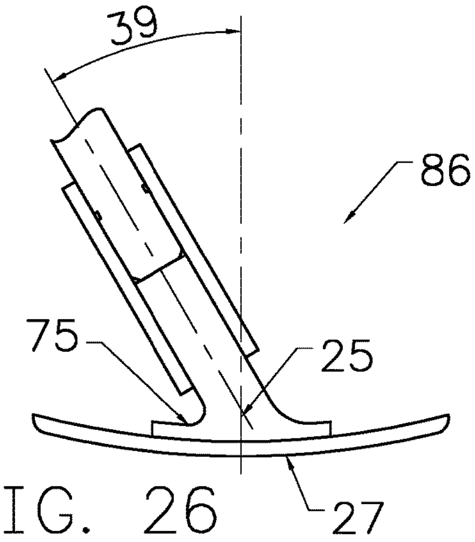
FIG. 26 is another cross-sectional view of the massage tool of FIG. 24, taken nominally along section E-E, showing the rod rotated off the vertical axis.

FIG. 26 shows another cross-sectional view of massage tool 86, taken nominally along section E-E for ease of illustration. This view shows the rod 5 rotated off the vertical axis. The rotation of the rod 5 is made possible by applying sufficient manual force to the flexible joint 75, which is formed from a material having sufficient strength and resilient flexibility to achieve an angle of deflection in a range between 0 degrees and about 30 degrees, or in other embodiments, between 0 degrees and about 45 degrees. The angle of deflection 39 of the rod 5 is with respect to the vertical line 25 that passes through an approximate center of rotation of the rod when the rod is in an undeflected state and oriented substantially perpendicular to the body contact area 27. When the manual force is removed, the flexure returns to its undeflected position.

Figure 27:
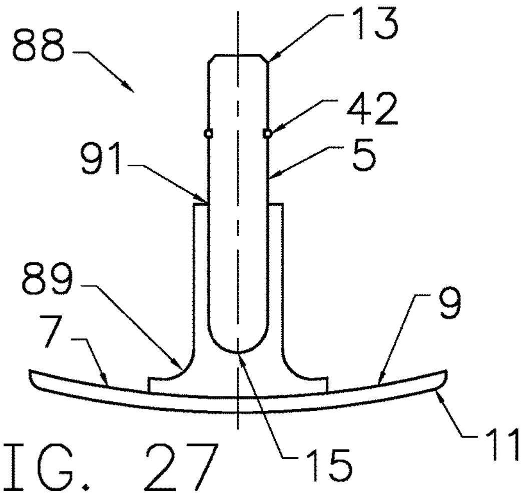
FIG. 27 is a cross-sectional view of the massage tool taken along section E-E of FIG. 24 and showing another implementation of the flexure joint.

FIG. 27 shows a cross-sectional view of an embodiment according to the invention of a massage tool 88. The cross-sectional view is taken nominally along section E-E of FIG. 24 for ease of illustration. Massage tool 88 provides another implementation of a flexible joint. In this case, the flexible joint is formed by mounting a specialized flexure 89 to the proximal side 9 of the body follower 7. Flexure 89 is formed from strong, resilient, flexible material and includes a receptacle 91 that is sized to accept and frictionally engage with the distal end of the rod 5. Flexure 89 may be bonded or fastened to, or formed integrally with, the proximal side 9 of the body follower. In one embodiment, flexure 89 includes a flexible portion and an inflexible portion. For example, the flexible portion may be located at the proximal end of the flexure, which the inflexible end may be located at the distal end of the flexure to provide a rigid base for coupling to the distal side of the body follower. In one embodiment, the flexible portion and inflexible portion are made from different materials, e.g. rubber and metal, respectively. In another embodiment, the material of flexure 89 is homogeneous, with flexible and inflexible portions determined by material thickness. The proximal end 13 of the rod 5 may have an o-ring 42 installed in a groove cut into the rod as shown and described in previous embodiments.

Figure 28:
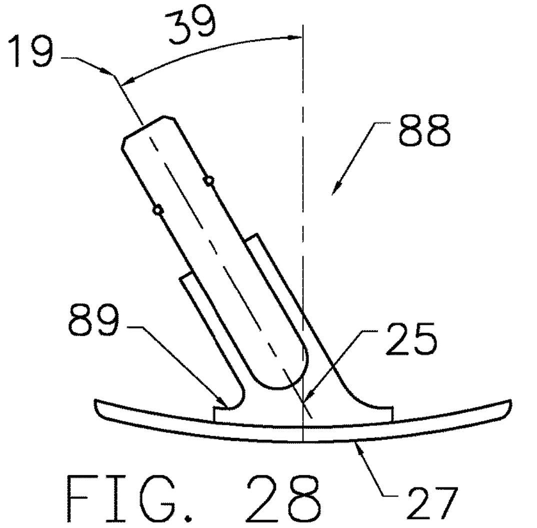
FIG. 28 is another cross-sectional view of the massage tool of FIG. 24, taken nominally along section E-E, showing the flexure joint implementation of FIG. 27 with the rod rotated off the vertical axis.

FIG. 28 shows a cross-sectional view of massage tool 88, showing the flexure joint implementation with the rod 5 rotated off the vertical axis. The cross-sectional view is taken nominally along section E-E of FIG. 24 for ease of illustration. This view shows a position of the rod 5, deflected off vertical by manual force, to form an angle 39 of about 30 degrees as shown between an axial line 19 running through the rod and a vertical line 25. In one embodiment, the massage tool 88 with flexure 89 is configured to allow angle 39 to span a range from about 0 degrees to about 30 degrees. In another embodiment, the angular range spans from 0 degrees to about 45 degrees. When the manual force is removed, flexure 89 will spring-return to its undeflected position represented by the vertical line 25 that passes through an approximate center of rotation and that is substantially perpendicular to the body contact area 27.

Figure 29:
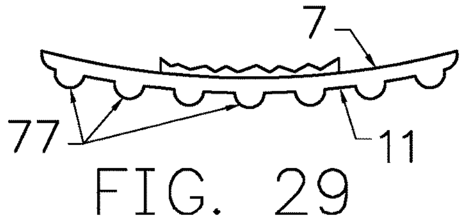
FIG. 29 is a magnified cross-sectional view of one embodiment of a massage tool according to the invention configured with a plurality of body contacting nubbins on the distal side of a body follower.
Figure 30:
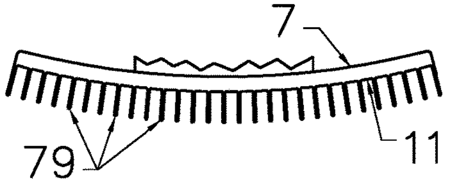
FIG. 30 is a magnified cross-sectional view of one embodiment of a massage tool according to the invention configured as a brush having flexible bristles on the distal side of a body follower.

FIGS. 29-30 show alternative embodiments for the configuration of the body contact area of a massage tool according to the invention. FIG. 29 is a magnified cross-sectional view of one such embodiment configured with a plurality of body contacting nubbins 77 formed on the distal side 11 of a body follower 7. Nubbins 77 extend generally perpendicularly from distal side 11, and may have rounded ends separated by a distance approximately equal to the length of nubbin protrusion. Other embodiments are possible in which the size and pattern of nubbins may vary. FIG. 30 is a magnified cross-sectional view of another such embodiment configured as a brush having flexible bristles displaced evenly along the curved surface of the distal side 11 of a body follower 7. Nubbins 77 and bristles 79 provide an operator with the ability to stimulate the muscles of a patient in different ways.

Figure 31:
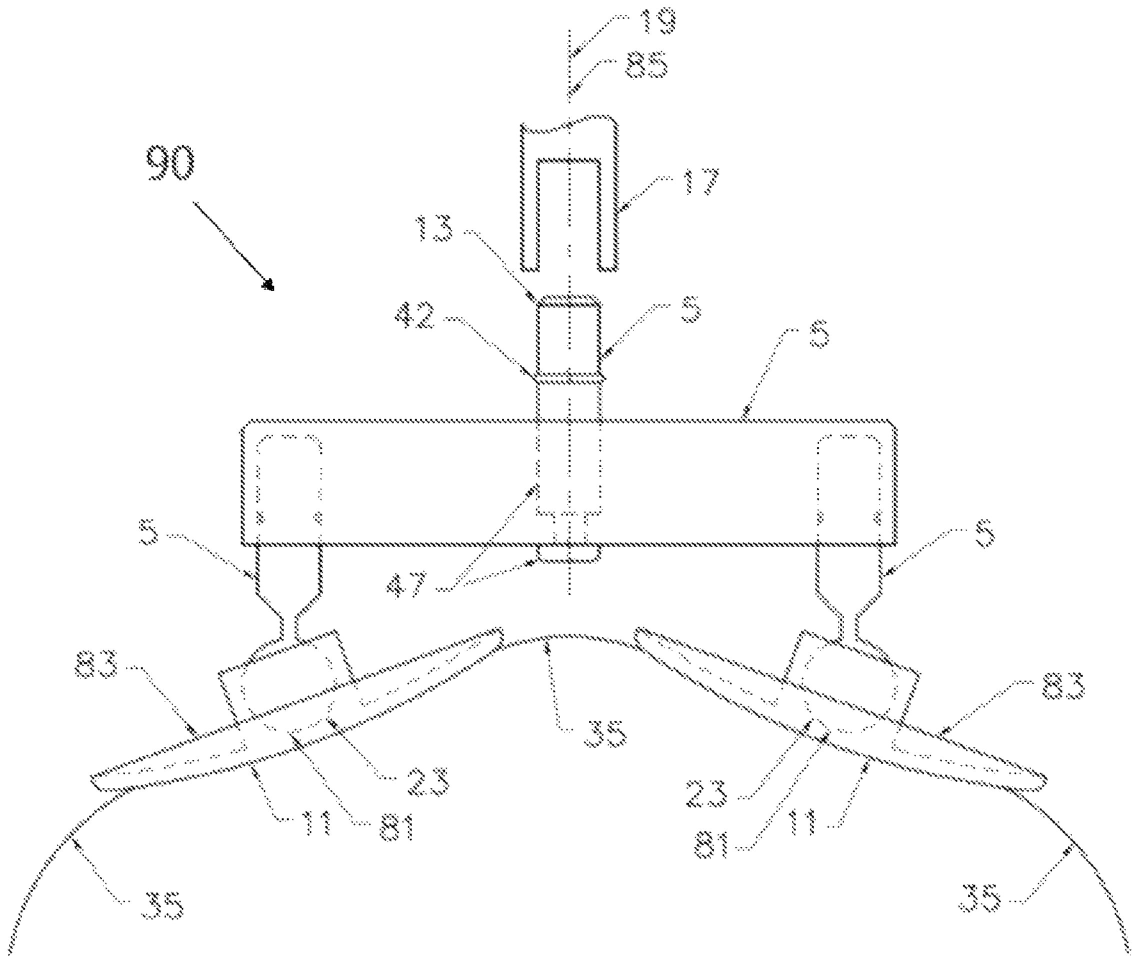
FIG. 31 is a side view of another embodiment of a massage tool according to the invention having a plurality of body followers.

FIG. 31 shows a side view of another embodiment according to the invention of a massage tool 90. Massage tool 90 is characterized as having a rod 5 configured for engagement to a reciprocating shaft 17, and having a plurality of distal ends 81 coupled to a respective plurality of body followers 83. The body followers 83 may be symmetrically disposed about a plane 85 passing through the stroke axis 19. A swivel 47 formed in the rod 5 allows the plurality of body followers 83 to rotate about the stroke axis. In this embodiment the proximal end 13 of the rod 5 is configured to be removably coupled to the reciprocating shaft 17, by means of a friction fit provided by an o-ring 42 installed in a groove cut into the rod as shown and described in previous embodiments herein. The body followers thus configured will independently remain in contact with, and aligned with a body surface 35, at multiple different contact areas, such as on a patient's thigh as shown in the figure. While tool 90 is depicted with two body followers 83, other embodiments having more than two body followers are possible within the scope of the invention. According to the invention, where multiple body followers are installed on a single massage tool, it is especially beneficial to construct the body contact areas 27 so that they curve in a proximal direction, as described in previous embodiments, to allow the tool be freely translated over irregular contours of the patient's body. Curvature of body followers in the opposite or distal direction, e.g., that mimic curvature of the patient's body, may cause a massage tool with multiple such body followers to mis-engage with or gouge the patient's skin as the tool is moved along the surface of the patient's body.

As for materials of construction, the major components of a massage tool 10 may be manufactured from stout materials such as certain metals, plastics, elastomers, and woods. For example, body followers may be formed from ABS plastic or synthetic rubber. Rods and balls may be machined from acetyl, nylon, or injection-moldable plastic, or may be formed from steel or aluminum. Branch arms may be machined from ABS plastic or acetyl bar stock. Smaller components such as connectors or fasteners between ball and rod, hinge pins, and swivel shafts may be machined from aluminum or steel. O-rings are preferably synthetic rubber such as neoprene or Viton™. Flexures may also be formed from a synthetic rubber, or from a thermoplastic such as polyurethane, or from a metal coil spring. Adapters needed for coupling the massage tool to jigsaws or other reciprocating motors may be machined from rugged materials, e.g., acetyl, steel, and aluminum. For mass production, a majority of the components may be manufactured from plastics, either by injection molding, heat-forming, or machining.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A massaging apparatus, comprising:
- a hand-held reciprocating motor having a shaft configured to reciprocate along a stroke axis;
- a rod having a proximal end couplable to the shaft to maintain the rod in axial alignment therewith, and one or more distal ends attaching one or more body followers symmetrically disposed about a plane passing through the stroke axis, each of the one or more body followers configured to contact a body surface of a patient; and
- a swivel formed in the rod and configured to allow the rod to swivel around the stroke axis in response to the one or more body followers being translated against and around contours of the body surface.

2. The massaging apparatus of claim 1, wherein the swivel allows an operator to guide the one or more body followers about the body surface while maintaining the one or more body followers in contact with the body surface.

3. The massaging apparatus of claim 2, further configured to allow the operator to maintain the one or more body followers in contact with the body surface by adjusting an angle of the stroke axis with respect to the body surface.

4. The massaging apparatus of claim 1, wherein the swivel allows the one or more body followers to turn on the stroke axis in response to opposing forces generated from the one or more body followers engaging the body surface.

5. The massaging apparatus of claim 1, wherein the swivel allows the operator to turn the reciprocating motor about the stroke axis without causing the one or more body followers to turn on the body surface.

6. The massaging apparatus of claim 1, wherein the proximal end of the rod is removably couplable to the shaft by friction-fit.

7. The massaging apparatus of claim 1, wherein the proximal end of the rod is removably couplable to the shaft by friction acting between the rod and the shaft.

8. The massaging apparatus of claim 1, further comprising an o-ring providing friction acting between the rod and the shaft.

9. The massaging apparatus of claim 1, wherein a coupling, coupling the rod to the shaft, comprises the swivel.

10. The massaging apparatus of claim 1, wherein each of the one or more body followers defines a body contact area.

11. The massaging apparatus of claim 1, wherein each of the one or more body followers is connected to one of the distal ends of the rod by a rotating joint.

12. The massaging apparatus of claim 1, further comprising a rotating joint on at least one of the distal ends of the rod.

13. The massaging apparatus of claim 12, wherein the rotating joint and the swivel allow the distal side of each of the one or more body followers to remain parallel with a body surface being massaged as an angle of one of the body followers with respect to the stroke axis is varied by an operator.

14. A tool, comprising:
- a hand-held reciprocating motor having a linear stroke axis;
- a contact area symmetrically disposed about a plane passing through the stroke axis; and
- a swivel coupling the contact area to the reciprocating motor, the swivel configured to allow the contact area to swivel around the stroke axis in response to the contact area being translated by hand against and around contours of an external surface.

15. The tool of claim 14, wherein the swivel allows the contact area in contact with the external surface to turn on the linear stroke axis in response to opposing forces generated between the contact area and the external surface.

16. The tool of claim 15, wherein the swivel allows an operator to turn the reciprocating motor about the linear stroke axis without causing the contact area to turn on the external surface.

17. The tool of claim 15, wherein the contact area comprises a curve, allowing the contact area to slide along the surface while reciprocating against the external surface.

18. The tool of claim 14, further comprising a plurality of contact areas disposed about the linear stroke axis.

* * * * *